United States Patent [19]

Dreulle

[11] 4,092,401
[45] May 30, 1978

[54] PROCESS FOR REUTILIZATION OF IRON CHLORIDES IN AQUEOUS SOLUTION

[75] Inventor: Nöel Dreulle, Douai, France

[73] Assignee: Compagnie Royale Asturienne des Mines, Brussels, Belgium

[21] Appl. No.: 758,136

[22] Filed: Jan. 10, 1977

[30] Foreign Application Priority Data

Jan. 9, 1976  France ................................. 76 00409

[51] Int. Cl.² .................... C01F 11/46; C01F 11/48; C01B 7/08; C01G 49/02
[52] U.S. Cl. .................................. 423/166; 423/242; 423/481; 423/632; 423/633; 423/555
[58] Field of Search ............... 423/481, 632, 633, 242, 423/555, 166

[56] References Cited

U.S. PATENT DOCUMENTS

| | | | |
|---|---|---|---|
| 2,073,039 | 3/1937 | Wilton et al. | 423/242 |
| 2,926,999 | 3/1960 | Tarbutton et al. | 423/242 |
| 3,794,714 | 2/1974 | Atsukawa et al. | 423/242 |
| 3,836,630 | 9/1974 | Noguchi et al. | 423/242 |
| 3,906,078 | 9/1975 | Hausberg et al. | 423/242 |
| 3,950,493 | 4/1976 | Dörr et al. | 423/242 |
| 4,024,220 | 5/1977 | Ostraff et al. | 423/166 |

FOREIGN PATENT DOCUMENTS 48,366   6/1964   Poland .................................. 423/632

OTHER PUBLICATIONS

C. A. Jacobson's "Encyclopedia of Chem. Reactions," vol. 4, 1951, p. 119, Reinhold Pub. Corp., N.Y.
J. W. Mellor's "A Comp. Treatise on Inorganic and Theoretical Chem.," vol. 14, 1935 Ed. pp. 23, 256, 257, Longmans, Green & Co., N.Y.

*Primary Examiner*—Edward Stern
*Attorney, Agent, or Firm*—Young & Thompson

[57] ABSTRACT

Process for the recovery of pigment-grade iron oxide and technical hydrochloric acid of predetermined molarity, from iron chloride solutions such as pickling solutions containing hydrochloric acid. The iron chloride solution is concentrated until the molarity of the chloride ion therein is the same as the molarity of the hydrochloric acid which it is desired to produce. Concentrated sulfuric acid in slight stoichiometric excess relative to the iron, is then added to the iron chloride solution, which solution is thereafter evaporated to dryness. The distillation from this evaporation is hydrochloric acid of the predetermined molarity, and the dry residue is iron sulfate. The iron sulfate is calcined to drive off sulfur dioxide and sulfur trioxide and to leave iron oxide which may contain sulfates; and to remove these latter, the iron oxide is leached with dilute hydrochloric acid and is thereafter washed with water. The washed iron oxide is dried and micropulverized to produce a red iron oxide pigment. The sulfur oxides driven off during calcination may be washed with concentrated sulfuric acid and recycled to the sulfating step, the concentrated sulfuric acid absorbing the sulfur trioxide and letting pass the sulfur dioxide which can if desired be used in the catalytic production of further sulfuric acid. Alternatively, the sulfur oxides can be washed with lime milk to produce calcium sulfite and calcium sulfate, which upon filtration and air drying becomes hydrated calcium sulfate usable as gypsum.

6 Claims, 1 Drawing Figure

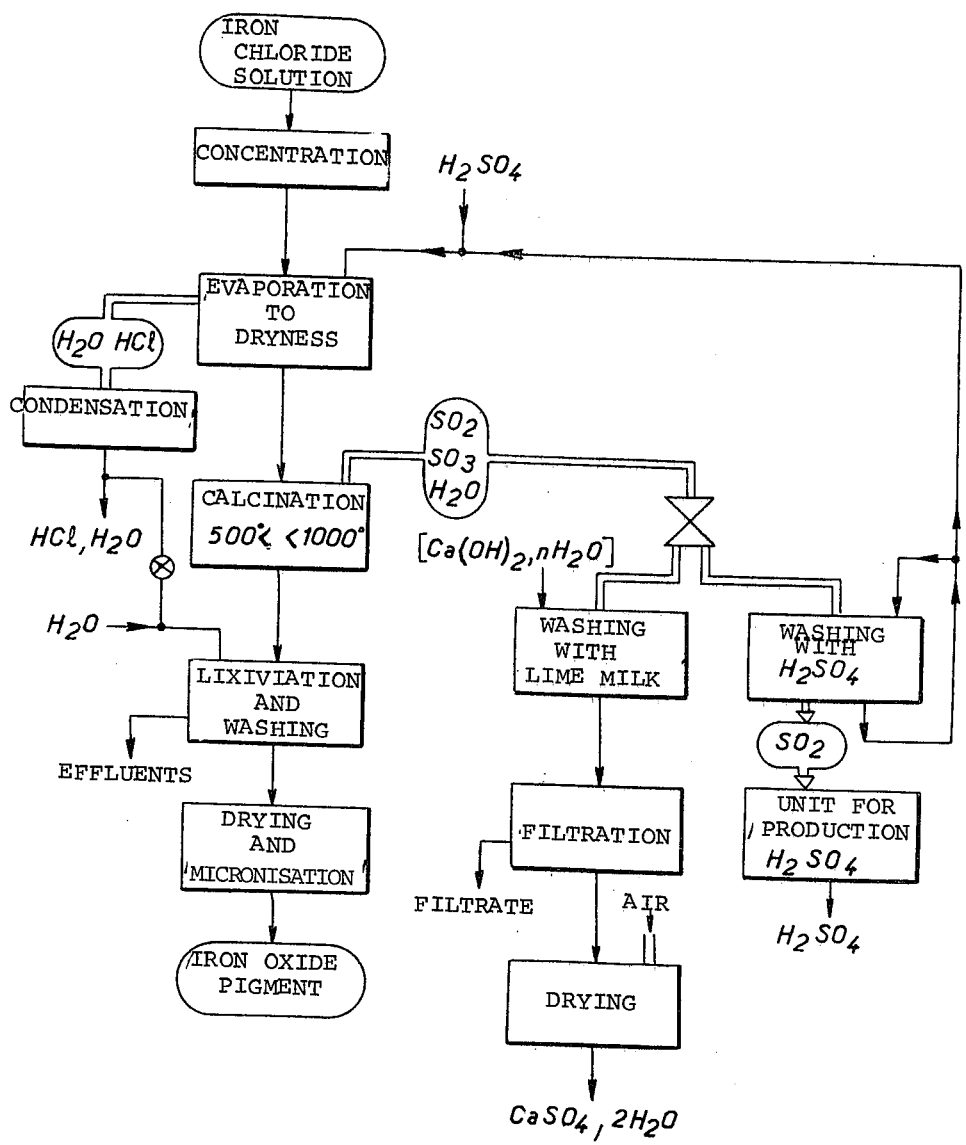

PROCESS FOR REUTILIZATION OF IRON CHLORIDES IN AQUEOUS SOLUTION

The present invention relates to a process for the reutilization of iron chlorides in aqueous solution, more particularly to a process for the recovery from such solutions of pigment-grade iron oxide and hydrochloric acid of predetermined molarity.

The iron chloride solutions may be aqueous solutions of ferric chloride, ferrous chloride or a mixture thereof. The solutions may contain a certain quantity of impurities. The chloride solutions may be of any desired origin, for example from acid pickling baths for ferrous metal prior to galvanization. In this case, the solutions contain a substantial amount of hydrochloric acid; and such solutions may not be sewered because they are detrimental to the environment.

It is known to neutralize such solutions with lime water, preferably under oxidizing conditions, to give ferric hydroxide slimes and a solution of calcium chloride. Also, the iron can be precipitated as ferrous chloride by bubbling hydrogen chloride gas through the solution. Finally, various processes are known for the thermal decomposition of the iron chlorides in the presence of water vapor, the product thus obtained being iron oxides and hydrogen chloride gas. These processes make it possible to obtain marketable hydrochloric acid, but the other products are of little value, as they are oxides and hydroxides of iron which are utilizable only as iron ores and which can accordingly be sold only at ore prices, and ferrous chloride for which the market is very limited, as well as calcium chloride of low market value.

Accordingly, it is an object of the present invention to provide a process for the reutilization of aqueous iron chloride solutions, thereby to recover pigment-grade iron oxides and hydrochloric acid of predeterminable molarity, both of which have substantial market value.

To this end, the invention provides a process for the reutilization of aqueous iron chloride solutions for the recovery of pigment-grade iron oxide and technical hydrochloric acid of predeterminable molarity, characterized in that an iron chloride solution is concentrated so that the molarity of the chloride ions will be equal to the desired molarity of the hydrochloric acid to be recovered, concentrated sulfuric acid is added in slight stoichiometric excess relative to the iron in the solution, the solution is evaporated to dryness, the vapors are condensed and recovered as hydrochloric acid of that predetermined molarity, the dry residue of iron sulfate is calcined at a temperature sufficient to decompose the iron sulfate and to drive off substantially all the sulphur as sulphur oxides which are recovered, and the resulting iron oxide is then leached in an acid solution and washed and dried and then fine-ground.

The evaporation to dryness of the concentrated solution to which the sulfuric acid has been added, is in fact a distillation of the hydrochloric acid which is recovered after condensation, at the predetermined molarity. The calcination of the iron sulfate comprises the decomposition thereof to iron oxide on the one hand and to volatile sulfur oxides comprising sulfurous and sulfuric anhydrides, on the other hand, which are recovered and may be used for substantially the entire reconstitution of the sulfuric acid which is added to the iron chloride solution. The leaching of the iron oxide separates the soluble products which would be undesirable in an iron oxide pigment.

Preferably, the selected molarity of the recovered hydrochloric acid is between 7 and 12 N.

Also preferably, the calcination of the iron sulfate is conducted at a temperature between 500 and 1,000° C. in an atmosphere whose oxidation-reduction potential can be varied as desired so as to vary the resulting hue of the iron oxide pigment that is obtained.

It is also preferred to wash the sulfur oxides that are driven off, with concentrated sulfuric acid and to recover sulfuric acid enriched in sulfuric anhydride on the one hand, and sulfur dioxide gas on the other hand. The sulfur dioxide gas is practically insoluble in the concentrated sulfuric acid; and this sulfur dioxide gas may be sent to a production unit for sulfuric acid that operates by catalytic oxidation so that between the sulfuric acid that leaves the washing step and is enriched in sulfuric anhydride and the sulfuric acid produced by catalytic oxidation of the sulfur dioxide gas, substantially all of the sulfuric acid added at the preceding stage of the operation is recovered.

As a variant, the sulfur oxides that are driven off may be washed with lime water and a precipitate of calcium sulfate and calcium sulfite may be recovered. This precipitate is filtered, washed and air-dried to give hydrated calcium sulfate of the same composition as natural gypsum.

Preferably, the iron oxide resulting from calcination is leached with a dilute aqueous solution of hydrochloric acid at a temperature above the ambient, then is washed and dried and ground to micropulverized form. This iron oxide is then salable as pigment.

Other objects, features and advantages of the present invention will become apparent from a consideration of the following description, taken in connection with the accompanying drawing, which is a schematic flow sheet of processes according to the present invention.

According to the embodiment of the invention shown in the drawing, an aqueous iron chloride solution is concentrated until the concentration of the chloride ion is equal to that of the hydrochloric acid which it is desired to recover, which concentration will generally be between 7 and 12 N. A quantity of concentrated sulfuric acid is added, which is in slight stoichiometric excess relative to the iron present in the chloride, so as to replace the chloride of the metal salts with sulfate.

The solution with added sulfuric acid is then evaporated to dryness. The resulting vapor of hydrochloric acid and water is concentrated and an aqueous solution of hydrochloric acid is thus obtained which has the predetermined molarity, that is, the molarity to which the chloride in the iron chloride solution was concentrated.

The residue is iron sulfate and is calcined at a temperature between 500° and 1,000° C., it being possible, as noted above, to select the temperature and oxidation-reduction conditions of the calcination atmosphere and the duration of calcination in a manner to vary the hue of the iron oxide pigment to be produced.

The iron oxide may contain metallic sulfates which decrease its value as a pigment, particularly as they are soluble. Therefore, the calcined iron oxide is leached with aqueous hydrochloric acid solution which may be a part of the hydrochloric acid condensed in the preceding evaporation step, this leaching being generally effectuated at a temperature above ambient. The iron oxide is then washed to remove the hydrochloric acid, dried and ground by micropulverization. The resulting iron oxide is of pigment quality.

In the course of the calcination, the volatile products which are driven off contain sulfurous anhydride, sulfuric anhydride, and water. These volatile products may be subjected to a washing step in which they are washed with concentrated sulfuric acid in which the sulfuric anhydride and water are absorbed, while the sulfurous anhydride or sulfur dioxide passes on and is sent to a unit for the production of sulfuric acid by catalytic oxidation. The sulfuric acid leaving this washing step is enriched in anhydride and partly in water. According to the water content of the volatile products, the sulfuric acid leaving the washer may be fuming sulfuric acid or concentrated sulfuric acid with a variable proportion of water. A part of this sulfuric acid is recycled to the washer and another part is returned to the sulfuric acid addition step that precedes evaporation to dryness of the concentrated iron chloride solution.

In a variant of the process, the volatile products of calcination are sent to a washing step in which they are washed with milk of lime, that is, lime water. The sulfur dioxide and sulfur trioxide thus are transformed to calcium sulfite and calcium sulfate, which precipitate. This precipitate is filtered and washed with water and then air-dried to produce calcium sulfate dihydrate of the same composition as natural gypsum and which may be used in the production of plaster of Paris. Alternatively, this gypsum may be discarded if its market price does not make it worth selling, as it has after all the composition of a natural mineral and so cannot pollute the environment.

In order to enable those skilled in this art to practice the invention, the following illustrative examples are given:

EXAMPLE 1

(a) A starting solution of ferric chloride and hydrochloric acid has the following composition:

| | |
|---|---|
| iron | 51.9 g/l |
| chlorine | 132 g/l |

Two liters of this ferric chloride solution are concentrated by reducing them to 0.83 liter, and the distillate is condensed and analyzed and found to contain 2.306 g of chlorine, which is 0.87% of the chlorine initially present in the solution. The residue concentrate thus contains 8.9 moles of chlorine per liter.

Three hundred and thirty grams of sulfuric acid, which is 98% acid and 2% water, are added to this concentrated solution of ferric chloride. The solution with added sulfuric acid is then evaporated to dryness and the vapors driven off are condensed. The condensate has a volume of 0.83 liter and is constituted by 8.9 N hydrochloric acid. The dry residue is ferric sulfate containing 103.8 grams of iron.

(b) The iron sulfate is calcined to 840° C. for two hours. There is thus obtained an iron oxide containing 1% sulfate. The volatile products driven off are a gaseous mixture of $SO_2$ and $SO_3$. The $SO_2$ corresponds to 44.3% of the sulfur present in the original sulfates, and the $SO_3$ accounts for the rest of the sulfur in the gas driven off.

(c) Ten grams of the iron oxide thus obtained are leached with 30 mm of an aqueous solution containing 3% by volume of 11 N hydrochloric acid. Leaching continues for 15 minutes at 60° C. The leached iron oxide is filtered and is washed with 60 mm of water at 20° C. The washed iron oxide is substantially free from sulfate and from chloride and is dried and micropulverized and is iron oxide of red pigment grade.

(d) The $SO_2$ and $SO_3$ driven off during calcination are washed with 600 ml of sulfuric acid which is 98% acid and 2% water. All the $SO_3$ is thus absorbed and a part is recycled to this washing and the remainder is sent back to the iron chloride solution, the $SO_2$ passing on to the catalytic production of further sulfuric acid.

EXAMPLE 2

Twenty grams of the iron sulfate obtained in step (a) of Example 1 are calcined as in step (b) of Example 1. The volatile products driven off during this calcination are washed with 800 mm of lime water. 99% of the $SO_2$ and $SO_3$ are thus precipitated as insoluble calcium sulfite and calcium sulfate. These calcium sulfite and sulfate precipitates are filtered, washed and air-dried. In the course of air drying, the sulfite oxidizes to sulfate; and the dried residue is calcium sulfate dihydrate of the composition of natural gypsum.

From a consideration of the foregoing disclosure, it will be evident that the initially recited object of the present invention has been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims:

What is claimed is:

1. Process for the recovery of a pigment-grade red iron oxide and technical hydrochloric acid of any desired molarity from aqueous iron chloride solutions, comprising concentrating a solution of iron chloride until the chloride ion concentration thereof is equal to the desired molarity of the techincal hydrochloric acid produced; adding to said concentrated solution concentrated sulfuric acid in slight stoichiometric excess relative to the iron of the solution, evaporating the solution to dryness, condensing the vapors from the evaporation step thereby to recover hydrochloric acid of said desired molarity, calcining the dry iron sulfate produced during the evaporation step at a temperature sufficient to decompose said iron sulfate thereby substantially entirely to drive off sulfur in the form of $SO_2$ and $SO_3$ recovering said sulfur oxides, leaching with a dilute aqueous solution of hydrochloric acid the iron oxide produced during said calcination so as to remove soluble metal sulfate impurities, washing the leached iron oxide, drying the washed iron oxide, and micropulverizing the dried iron oxide.

2. Process as claimed in claim 1, in which said desired molarity of the recovered hydrochloric acid is between 7 and 12 N.

3. Process according to claim 1, and conducting said calcination at a temperature between 500° and 1,000° C.

4. Process according to claim 1, in which said sulfur oxides consist of sulfur dioxide and sulfur trioxide, and washing said sulfur oxides with sulfuric acid thereby to absorb said sulfur trioxide and to separate said sulfur trioxide from said sulfur dioxide.

5. Process as claimed in claim 4, and returning a portion of said sulfuric acid with which said sulfur oxides are washed, to said addition of concentrated sulfuric acid to said iron chloride solution.

6. Process as claimed in claim 1, and washing said sulfur oxides with lime milk thereby to precipitate calcium sulfate and calcium sulfite, filtering said precipitate, and air-drying the precipitate to produce hydrated calcium sulfate.

* * * * *

UNITED STATES PATENT AND TRADEMARK OFFICE
CERTIFICATE OF CORRECTION

PATENT NO. : 4,092,401
DATED : May 30, 1978
INVENTOR(S) : Noel DREULLE

It is certified that error appears in the above-identified patent and that said Letters Patent are hereby corrected as shown below:

IN THE SPECIFICATION:

Column 3, line 62, change "30 mm" to --30 ml--;

Column 3, line 65, change "60 mm" to --60 ml--;

Column 4, line 11, change "800 mm" to --800 ml--.

Signed and Sealed this

Twenty-sixth Day of December 1978

[SEAL]

Attest:

RUTH C. MASON
Attesting Officer

DONALD W. BANNER
Commissioner of Patents and Trademarks